United States Patent
Lowell et al.

(10) Patent No.: US 7,376,949 B2
(45) Date of Patent: May 20, 2008

(54) RESOURCE ALLOCATION AND PROTECTION IN A MULTI-VIRTUAL ENVIRONMENT

(75) Inventors: David E. Lowell, San Francisco, CA (US); Caroline M. Tice, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 923 days.

(21) Appl. No.: 10/676,921

(22) Filed: Oct. 1, 2003

(65) Prior Publication Data

US 2005/0076324 A1    Apr. 7, 2005

(51) Int. Cl.
   *G06F 9/455* (2006.01)
(52) U.S. Cl. ............................. 718/1; 710/36
(58) Field of Classification Search .................. 718/1; 710/36
   See application file for complete search history.

(56) References Cited

U.S. PATENT DOCUMENTS

| | | | | |
|---|---|---|---|---|
| 4,843,541 | A * | 6/1989 | Bean et al. | 710/36 |
| 5,901,312 | A * | 5/1999 | Radko | 718/104 |
| 6,075,938 | A * | 6/2000 | Bugnion et al. | 703/27 |
| 7,035,963 | B2 * | 4/2006 | Neiger et al. | 711/6 |
| 7,036,122 | B2 * | 4/2006 | Bennett et al. | 718/1 |
| 7,069,413 | B1 * | 6/2006 | Agesen et al. | 711/207 |
| 7,278,030 | B1 * | 10/2007 | Chen et al. | 713/189 |
| 7,296,267 | B2 * | 11/2007 | Cota-Robles et al. | 718/1 |
| 2004/0205203 | A1 * | 10/2004 | Peinado et al. | 709/229 |

OTHER PUBLICATIONS

Analysis of the Intel Pentium's Ability to Support a Secure Virtual Machine Monitor John Scott Robin, Cynthia E. Irvine Proceedings of the 9th USENIX Security Symposium, Aug. 2000.*
VM/4z ACOS-4 Virtual Machine Architecture S. Nanba, N. Ohno, H. Kubo, H. Morisue, T. Ohshima, H. Yamagishi 1985 IEEE.*
Running Multiple Operating Systems Concurrently on an IA32 PC Using Virtualization Techniques Kevin Lawton GNU Free Documentation License Verion 1.1, Sep. 29, 1999.*
Cellular Disco: Resource Management Using Virtual Clusters on Shared-Memory Multiprocessors Kinshuk Govil, Dan Teodosiu, YoungQiang Huang, Mendel Rosenblum ACM Transactions on Computer Systems, vol. 18, No. 3, p. 229-262, Aug. 2000.*
A VMM Security Kernel for the VAX Architecture Pual A. Karger, Mary Ellen Zurko, Douglas W. Bonin, Andrew H. Mason, Clifford E. Kahn IEEE 1990.*

* cited by examiner

*Primary Examiner*—Lewis A. Bullock, Jr.
*Assistant Examiner*—Meng Yao Zhe

(57) ABSTRACT

A computer includes hardware, a virtual machine monitor, and first and second operating system instances. The virtual machine monitor is used to expose a first operating system instance to a first hardware partition and prevent the first operating system instance from discovering a second hardware partition; and expose a second operating system instance to the second hardware partition and prevent the second operating system instance from discovering the first hardware partition. The virtual machine monitor is also used to share at least some of the hardware among the first and second operating system instances.

37 Claims, 5 Drawing Sheets

RESOURCE ALLOCATION AND PROTECTION IN A MULTI-VIRTUAL ENVIRONMENT

BACKGROUND

A virtual machine monitor ("VMM") creates an environment that allows multiple operating systems to run simultaneously on the same computer hardware. In such an environment, applications written for different operating systems (e.g., Windows, Linux) can be run simultaneously on the same hardware.

When an operating system is run on a VMM, unprivileged instructions of the operating system execute on the hardware at full hardware speed. However, most or all instructions that access a privileged hardware state traps to the VMM. The VMM simulates the execution of that instruction as needed to maintain the illusion that the operating system has sole control over the hardware on which it runs.

I/O handling involves two levels of device drivers for each device: one maintained by the VMM, and the other maintained by the operating system. When an application requests the operating system to perform an I/O function, the operating system invokes a device driver. That device driver then invokes the corresponding device driver maintained by the VMM to perform the I/O function. Similarly, when an I/O interrupt comes in, a VMM device driver handles the incoming interrupt and then delivers it to the corresponding device driver maintained by the operating system.

The VMM adds to the overhead of the computer. The two layers of device drivers add to the overhead by increasing the amount of software that processes I/O requests and interrupts. Overhead is also added by constantly trapping and simulating privileged instructions, and by forcing I/O requests to go through two levels of device drivers. This overhead can slow interrupt handling, increase the fraction of CPU bandwidth lost to software overhead, increase response time, and decrease perceived performance.

It would be desirable to reduce the overhead of the VMM.

SUMMARY

A computer includes hardware, a virtual machine monitor, and first and second operating system instances. According to one aspect of the present invention, the virtual machine monitor is used to expose the first operating system instance to a first hardware partition and prevent the first operating system instance from discovering a second hardware partition; and expose the second operating system instance to the second hardware partition and prevent the second operating system instance from discovering the first hardware partition. The virtual machine monitor is also used to share at least some of the hardware among the first and second operating system instances.

Other aspects and advantages of the present invention will become apparent from the following detailed description, taken in conjunction with the accompanying drawings, illustrating by way of example the principles of the present invention.

DETAILED DESCRIPTION

Figure 1:
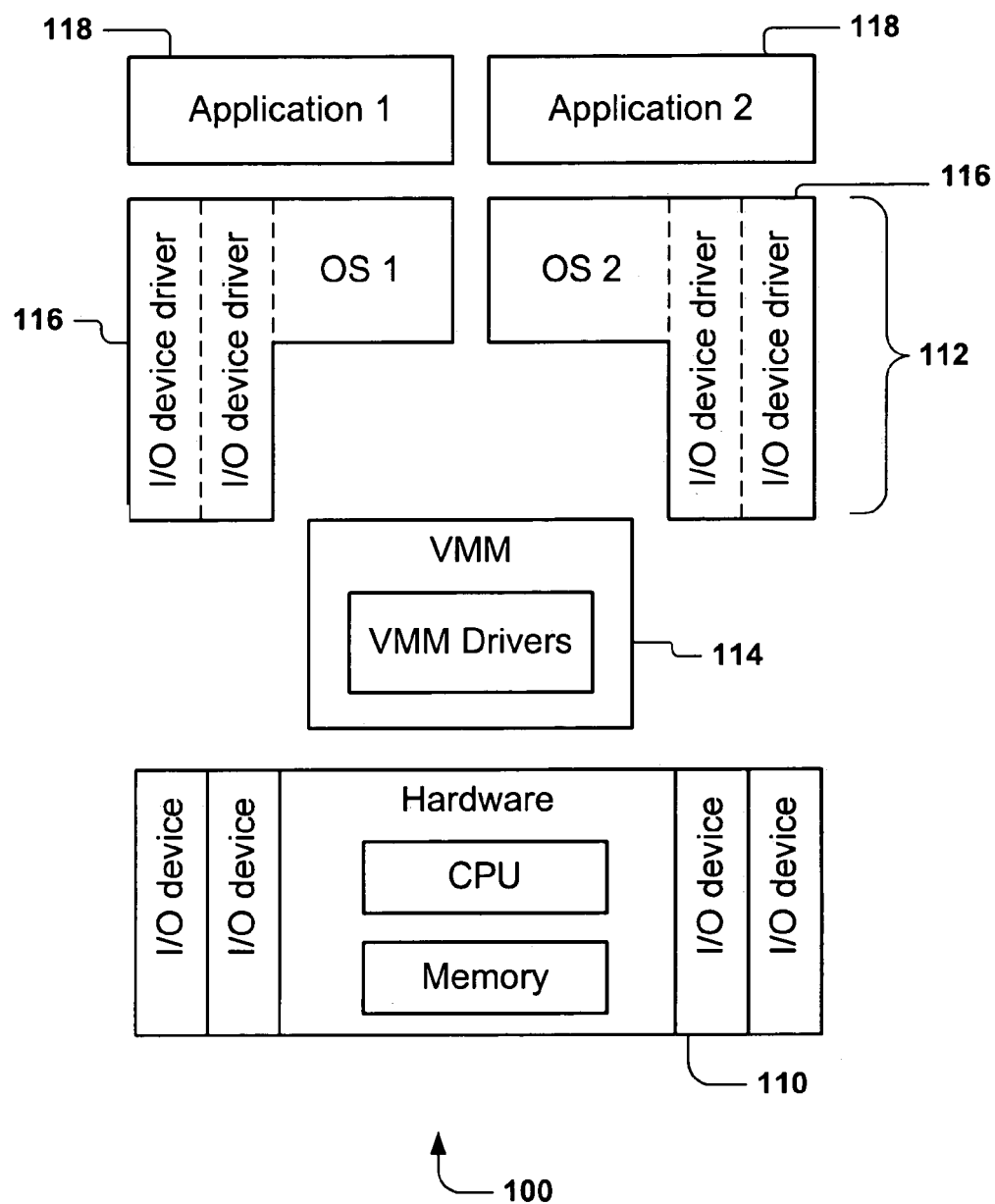
FIG. 1 is an illustration of hardware and software layers of a computer in accordance with an embodiment of the present invention.

As shown in the drawings for purposes of illustration, the present invention is embodied in a computer that runs a virtual machine monitor. The computer is not limited to any particular type. Examples of computers include file servers, web servers, workstations, mainframes, personal computers, personal digital assistants (PDAs), print servers, and network appliances. The computer can be contained in a single box, or distributed among several boxes.

FIG. 1 shows different layers of an exemplary computer 100. The computer 100 has a raw hardware layer 110. The raw hardware layer 110 typically includes a central processing unit (CPU), memory and I/O devices. Exemplary I/O devices include, without limitation, network adapters, SCSI controllers, video cards, host bus adapters, and serial port adapters. The memory refers to the memory that is internal to the computer 100 (e.g., internal memory cache, main system memory) as opposed to external storage devices such as disk drives.

A VMM 114 runs between the raw hardware layer 110 and an operating system layer 112. The VMM 114 is loaded during bootup of the computer 100, receives control of the hardware at boot time, and maintains hardware control until the computer 100 is shut down. The VMM 114 allows one or more operating system instances 116 to run simultaneously in the operating system layer 112. Applications 118 are run on the operating system instances. During execution, this software 114-118 can be stored in "articles" such as the memory; and during distribution, the software can be stored in articles such as external devices, removable storage media (e.g., optical discs), etc.

An operating system need not be modified to run on the VMM 114 or designed for that purpose, but instead may be a commodity operating system without special support for running in a virtual machine (such as Microsoft Windows, Linux, Tru64 Unix, etc.). Thus, the VMM is "transparent" to the operating system instances. Similarly, the raw hardware layer 110 need not provide special support for the VMM 114. The VMM 144 can work on commodity hardware not having features that help or accelerate virtualization (such as Intel x86, Intel Itanium, and HP Alpha).

Figure 2:
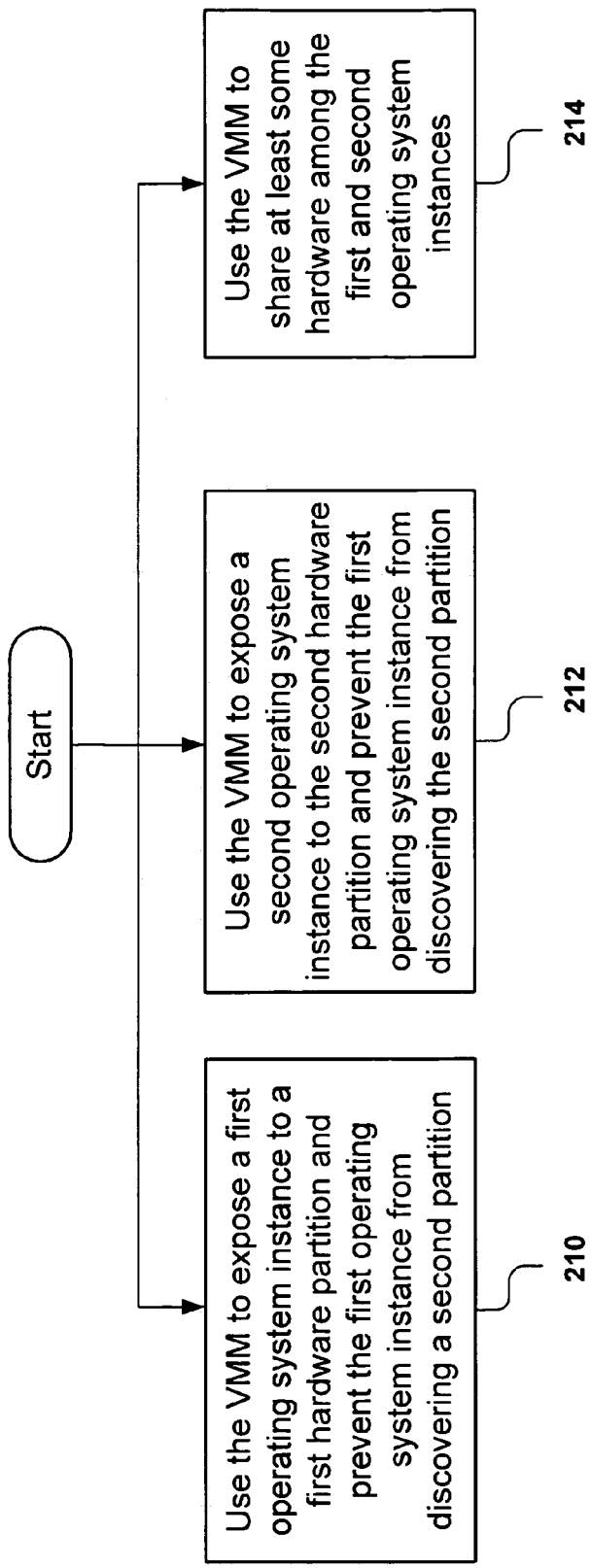
FIG. 2 is an illustration of a general method of using a virtual machine monitor in accordance with the present invention.

Additional reference is made to FIG. 2. The VMM 114 is used to expose a first operating system instance 116 to a first hardware partition and prevent the first operating system instance 116 from discovering a second hardware partition (210); and expose a second operating system instance 116 to the second hardware partition and prevent the second operating system instance from discovering the first hardware partition (220). Hardware partitions may include different I/O devices, different portions of memory, etc. The VMM 114 is also used to share at least some of the hardware (e.g., the CPU) among the first and second operating system instances (230). The VMM 114 may perform emulation to share the hardware. Using this method, the VMM 114 allows the first instance to have direct control over the first partition, and the second instance to have direct control over the second partition.

The VMM 114 may maintain its own device drivers for shared resources and other resources that are not under direct control of an OS instance. These native VMM drivers interface with virtual OS drivers in the usual manner. However, the VMM does not maintain a corresponding driver for each device driver controlled directly by an OS instance 116. The native drivers of each OS interface directly with the hardware in its corresponding partition, handle interrupts, and directly issue I/O instructions to the hardware device(s) it manages. Resulting is less software to run on I/O system calls and interrupts.

The VMM 114 can be used to partition the hardware layer 110 in any of the following ways: multiple operating system instances 116 share the CPU and memory, but each OS instance 116 has direct control over its own I/O devices; memory alone is partitioned, whereby multiple operating system instances 116 have limited, direct control over distinct portions of memory; all memory and all I/O devices are partitioned; and some memory and some I/O devices are partitioned, while remaining memory and I/O devices are shared. The VMM 114 can even allow different operating systems 116 to have limited, direct control over different processors in a multi-processor unit. These examples are not exhaustive; the hardware layer 110 can be partitioned in other ways.

Such use of the VMM 114 can reduce its overhead and thereby increase the speed of interrupt handling, increase the fraction of CPU bandwidth lost to software overhead, reduce response time, and increase perceived performance.

The decision to partition the hardware 110 may be made by a system administrator. The system administrator can make this decision and inform the VMM 114 via a GUI, command line interface, or other means to assign specific I/O devices to each OS instance, the amount of memory to each OS instance, the processors in a multi-processor unit, etc. The VMM 114 may set up an internal table indicating how hardware resources should be dedicated.

Partitioning can be performed by using the CPU's memory management hardware to manage "virtual" memory. Applications and operating systems typically access virtual memory, which is an abstraction. Each virtual memory access is translated into a "physical" access in order to reach the actual memory in the hardware layer 110. Virtual and physical memory are divided up into small chunks of memory called pages. The mapping of virtual pages to physical pages is typically defined by the operating system and usually represented by "page tables". Each page table contains a list of page table entries ("PTEs"), and each PTE typically maps one page of virtual address space to one physical page and defines its permissions (read, write, execute, etc.) for that page (on some architectures one PTE can map more than one page). As the OS instance and application access virtual addresses, those accesses are typically translated into physical accesses by a Translation Lookaside Buffer ("TLB") within the CPU. When a virtual address is accessed for which there is not a valid translation in the TLB, the appropriate PTE is read from the current page table, and then loaded into the TLB. This fill operation may be performed by a TLB miss handler in the VMM (on some platforms and architectures), or by firmware (in other architectures), or by PALcode (in the HP Alpha Architecture), or by the hardware (in still other architectures). By managing the CPU's virtual memory translation, the VMM can cause the CPU to trap to the VMM on addresses of potential interest.

Figure 3:
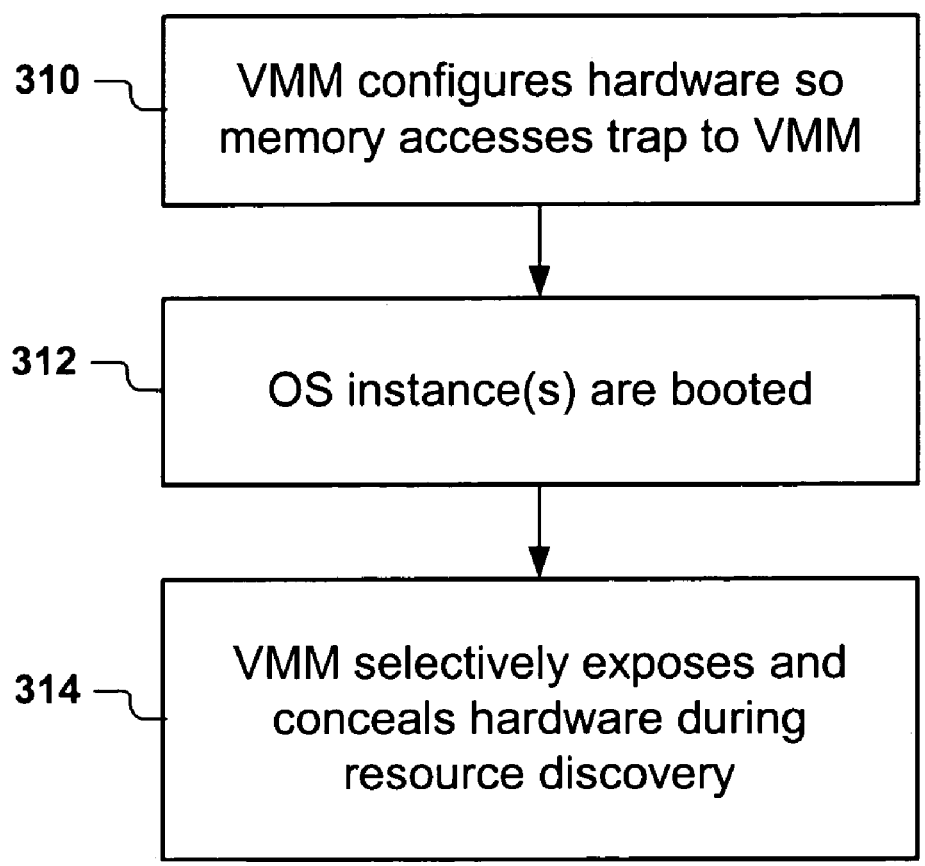
FIG. 3 is an illustration of a method of using a virtual machine monitor in accordance with an embodiment of the present invention.

Reference is now made to FIG. 3, which illustrates a method of using the CPU's memory management hardware to manage virtual memory. The VMM configures the memory management environment (via the page tables, TLB, memory management control registers, etc.) to trap when an OS instance attempts to probe for the existence of particular I/O devices by loading from or storing to well-known memory locations associated with those devices (310). How the VMM causes these traps depends upon how translations for memory accesses are inserted. For example, if the VMM handles TLB misses, it can refuse to load the TLB with a PTE for the page containing that virtual address, or it can install a PTE for that page with permissions such that the desired accesses will fault. When the desired TLB miss trap or protection trap occurs, the VMM handler for that event can check to see whether the faulting address is one of interest, and then handle that access specially (for example, by emulating that access, modifying the result of that access, or translating that access to a different address).

If the VMM is not the party that handles TLB fills, the VMM can still cause particular virtual addresses to trap by configuring the CPU to use page tables defined by the VMM. By examining the OS instance's page tables, the VMM can populate its page tables with the OS instance's translations as desired, but can also modify those translations as needed to cause the desired memory accesses to trap (e.g. by modifying the permissions for a particular page). The VMM can also add translations to its page tables to map or trap addresses beyond those mapped by the OS instance.

How the VMM traps the OS instance's accesses to I/O and memory also depends on whether those accesses are to physical or virtual addresses. On many systems, accesses to physical addresses normally bypass the TLB, making it difficult to trap them. However, most modern architectures have the ability to disable the direct addressability of physical memory and I/O space. By setting the appropriate bits in the CPU (310), the VMM can configure the CPU to treat accesses to physical I/O or memory addresses as normal virtual accesses. After that, the VMM can manage and trap those accesses.

Figure 4A:
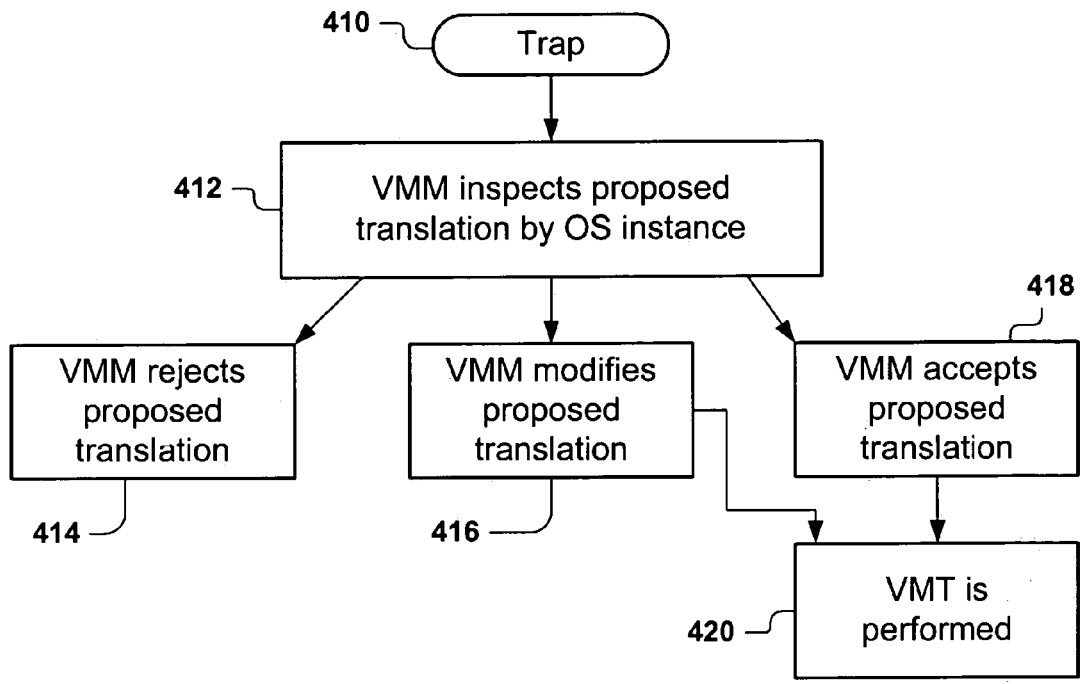
FIGS. 4a and 4b are illustrations of how a virtual machine monitor handles traps in accordance with embodiments of the present invention.

Reference is now made to FIG. 4a. To trap OS accesses to addresses mapped into virtual memory, the VMM examines, and possibly modifies, the virtual-to-physical mappings set up by the OS. The VMM can do so either when the OS modifies its page tables (by configuring hardware to trap when those modifications take place), or upon a TLB miss trap for the address in question (if the VMM handles TLB fills). When either type of trap occurs (410), the VMM inspects the proposed translation by-an OS instance (412), for example, checking to see whether the OS instance maps a virtual page to a physical page in I/O space containing an I/O device that the OS instance is allowed to use. The VMM is free then to reject the translation (414), possibly emulating some kind of protection fault. The VMM is also free to modify the proposed translation (416), for example, by changing the protections associated with that mapping, or mapping that virtual page to a different physical page than the OS proposed. The VMM may also accept the proposed translation (418). After modifying or accepting the translation, the VMM allows virtual memory translation (VMT) to be performed using that translation (420), either by putting the translation into the TLB, or by storing it as a valid translation in the VMM's page tables.

The VMM can install an accepted or modified translation for that access into the TLB or page table and let the access continue. All future accesses to that page that satisfy the permissions for that page in the TLB will succeed, until that translation entry is evicted from the TLB during the normal course of its operation, the VMM removes the entry from its page table(s), and/or the VMM flushes it from the TLB. As a result, by installing a translation for that access, the VMM gives up its ability to trap those accesses while the TLB holds the translation. Thus the VMM grants unfettered access by the OS instance to the range of physical memory covered by the translation entry in the TLB, while the VMM still retains control over the rest of physical memory. The VMM can revoke this unfettered access whenever it wants by flushing the TLB and refusing to reinstall the required translations.

Returning to FIG. 3, once the hardware has been configured, operating system instances are booted on the VMM (312). When an OS instance is booted, it goes through resource discovery. During resource discovery, the booting OS instance determines the number of processors in the hardware, the amount of memory installed, and the particular I/O devices present.

Different platforms and operating systems perform resource discovery in different ways. For example, some operating systems "probe" for the existence of I/O devices by loading or storing to well-known addresses in physical memory or I/O space, and detecting the presence of a particular device by the value returned from those probes. For example, on platforms using PCI, it is common for operating systems to probe for the presence of a device in a particular PCI slot by reading a location associated with that slot in the PCI Configuration Space (a region of I/O space). If that read returns the value −1, the OS concludes that slot is empty. If however, that read returns a value other than −1, the OS concludes there is a device in that slot, and the value returned indicates what type of device is present.

On other platforms, a booting OS instance may also discover hardware resources by reading a table from memory describing the machine's installed hardware. This table may be constructed during reset by the firmware, it may be constructed during a prior boot of the operating system, it may be filled in by another layer of software that gets control ahead of the operating system during boot, it may be written into non-volatile memory by the computer manufacturer, etc.

Figure 4B:
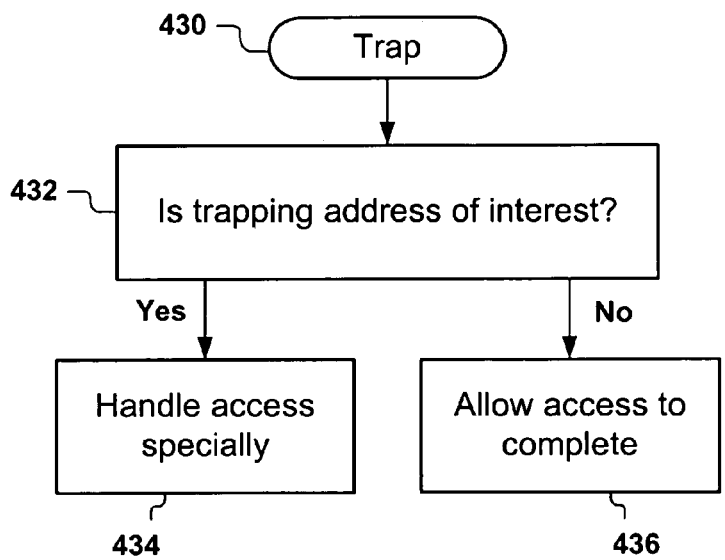

Reference is made to FIG. 4*b*. Since the VMM has already been configured to trap when a booting QS instance probes I/O space, the resource discovery causes traps to occur (430) The VMM examines the trapping address to determine whether it is an address of interest (432). For example, the VMM might determine whether the trapping address corresponds to the probe for the existence of a particular I/O device. If so, the VMM may handle that access specially (434). For example, the VMM may emulate that access in order to return a particular result from the probe. If the faulting address is not one of interest, the VMM can allow that access to complete (436). For example, the VMM may insert a translation for that access into the TLB and restart the instruction that trapped.

Returning once again to FIG. 3, in order to partition hardware resources in a manner transparent to the booting OS instance, the VMM selectively exposes and conceals hardware during resource discovery (314). If the VMM wants the booting OS instance to discover an I/O device, the VMM can let the probe of the hardware complete successfully (which may entail emulating the instruction that trapped, modifying the contents of the TLB or page tables and restarting the instruction that trapped, etc.). If the I/O device should not be discovered by that OS instance, the VMM emulates the instruction that trapped (e.g., by returning a value from the probe to the OS instance indicating that the device is not present).

The VMM can selectively expose or conceal hardware from a booting OS instance that discovers I/O devices via a hardware description table. The hardware description table can be modified in place to hide the existence of hardware the OS instance should not discover, and reveal the existence of hardware that OS will own or share. The VMM may also make a copy of the hardware description table, modify the copy to reveal or conceal hardware, and present the modified copy to the booting OS instance.

Although each OS instance has control over its own I/O devices, system memory may be shared by multiple OS instances. The VMM reserves management of virtual memory translation.

Partitioning of memory may be static. For example, the first OS instance to boot gets only a slice of available memory dedicated to it, the second OS instance to boot gets a slice, and so on. If half the available memory is dedicated to the first OS instance, and the other half of available memory is dedicated to the second OS instance, then only boot two OS instances are booted. On most platforms, firmware provides the booting OS instance with a table describing the memory installed in the system. To statically partition memory, the VMM can modify this table (or a copy of the table) to expose the memory that should be claimed by the booting OS instance.

Memory partitioning may also be dynamic. Each operating system may have a special device-driver/kernel-module that allows memory sharing. For example, the drivers may allow the second OS instance to "borrow" a page of memory from the first OS instance. The driver in the first OS instance requests a page of memory from the first OS instance, and "pins" that page to prevent the first OS instance from taking it back prematurely. Via either an application or the VMM, the driver in the first OS instance then hands the page to the corresponding driver in the second OS instance, which places that page on the OS's free list, and increments its count of available pages. Memory can be returned from the second OS instance to the first OS instance through the reverse path.

Figure 5:
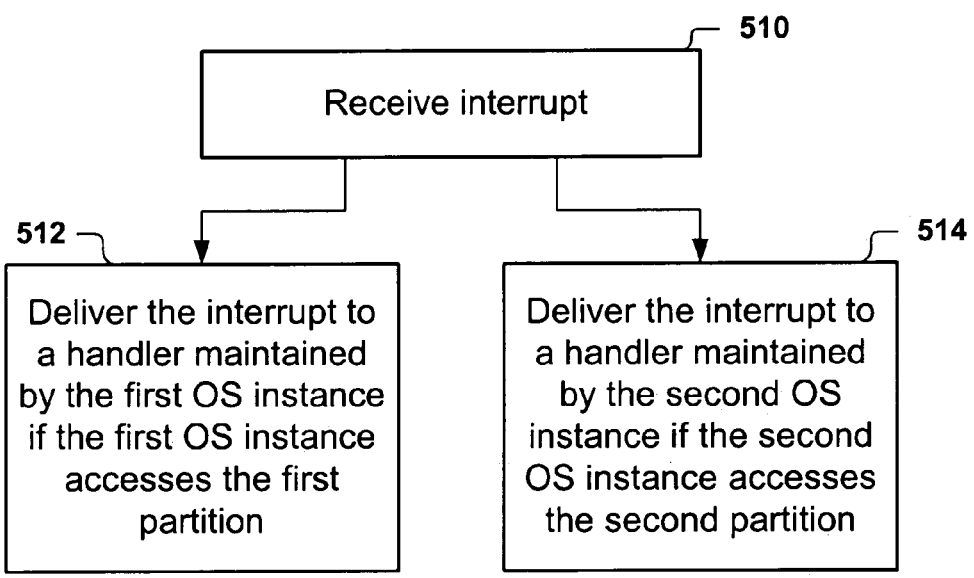
FIG. 5 is a flow chart of a method of how a virtual machine monitor handles interrupts in accordance with an embodiment of the present invention.

Reference is now made to FIG. 5, which illustrates how the VMM also uses interrupt handling to share hardware resources and partition I/O devices. An interrupt table associates interrupt requests with handler addresses. When an interrupt is received (510), the VMM executes a jump instruction to invoke the corresponding handler. The interrupts are delivered to interrupt handlers maintained by the first instance if the first instance accesses the first partition (512); and interrupts are delivered to interrupt handlers maintained by the second instance if the second instance accesses the second partition (514).

The VMM ensures that the correct interrupt handler is invoked when the corresponding hardware interrupt occurs. Determining which OS instance should handle an interrupt can be trivial on a platform in which different I/O devices generate different processing unit interrupts. However, it is common for systems to multiplex I/O interrupt lines to the processing unit. In this case, an interrupt handler in the VMM fields the interrupt, determines which device generated that interrupt, and queries its internal tables to figure out which OS instance is assigned to that device. The VMM delivers the interrupt to the assigned OS instance by executing a "jump" instruction to the starting address of the OS's handler (possibly lowering the privilege level of the CPU first, if the VMM normally runs in a more privileged processor mode than the OS). If the OS instance currently running is not the one that should receive the interrupt, the VMM can save the state of the running OS instance in memory, and restore the state of the one to receive the interrupt (this OS swapping may be carried out in the standard way). Once the correct OS instance is running, the VMM delivers its interrupt to it. In lieu of immediately switching contexts to the OS that is to receive the interrupt, the VMM may also queue up the interrupt for later delivery.

An exemplary interrupt table is provided below. The exemplary table indicates two partitions and shared resources. The shared resources (handled by the VMM handlers) include processing unit interrupts such as NMI, machine check, timer, interprocessor, and cycle counter. The first partition includes a first ethernet adapter (Ethernet 1) and a first SCSI adapter (SCSI1) for a first operating system instance (OS1). The second partition includes a second ethernet adapter (Ethernet 2) and a second SCSI adapter (SCSI2) for a second operating system instance (OS2).

EXEMPLARY INTERRUPT TABLE

| Interrupt Request | Device | Handled by | Handler Address |
| --- | --- | --- | --- |
| 0 | NMI | VMM | 0x200 |
| 1 | Mach Check | VMM | 0x400 |
| 2 | Timer | VMM | 0x600 |
| 3 | Inteprocessor | VMM | 0x800 |
| 4 | Cycle counter | VMM | 0xA00 |
| 5 | Ethernet 1 | OS1 | 0xC00 |
| 6 | Ethernet 2 | OS2 | 0x80000C40 |
| 7 | SCSI 1 | OS1 | 0xC80 |
| 8 | SCSI 2 | OS2 | 0x80000CC0 |

In summary, the VMM can minimize its intrusion into I/O processing through the interrupt mechanism and the memory management hardware. For example, when an I/O device generates an interrupt, the VMM delivers the interrupt to the appropriate OS handler. Thus the VMM does not invoke a handler in a VMM device driver. Similarly, when an OS instance calls an I/O device driver maintained by that OS instance, that device driver loads and stores to I/O address space without the need of a VMM driver. Thus when an OS instance performs an I/O operation, its device driver is able to perform loads and stores directly to the I/O device in question, without having to funnel its requests through another device driver in the VMM. As a benefit, less software runs on I/O system calls and interrupts.

Three specific examples will now be described. In the first example, the VMM allows multiple OS instances to have direct, limited control over different I/O devices. In the second example, the VMM allows multiple OS instances to have direct, limited control over different segments of memory. In the third example, the virtual machine monitor partitions I/O devices bus-wise. The first and second examples are based on the Alpha architecture. The third example is not limited to the Alpha architecture.

EXAMPLE 1

Partitioning of I/O

In the Alpha architecture, OS instances often access physical memory and I/O space via KSEG addresses. The KSEG addresses are used like virtual addresses, but have a special bit pattern in the high bits to alert the hardware that the low bits should be treated as a physical address and the load or store to that physical address can bypass the TLB. The VMM can disable KSEG accesses to control which OS instance accesses which I/O devices. By setting appropriately SPE bits in the M_CTL register, each use of a KSEG address by an OS instance is treated by the hardware like a normal virtual address and is translated into a physical address by the TLB. if an appropriate translation for that access is not already present in the TLB, the access will cause a trap to the TLB miss handler in the VMM. The VMM is free to emulate that KSEG access, reject it, redirect it to another address, or put a translation for that access into the TLB and let the access continue. If it chooses this last path, all future accesses to the same page on which that particular KSEG address falls (that satisfy the permissions for that page in the TLB) will succeed, until the TLB hardware evicts that translation entry during the normal course of its operation, or the VMM flushes that translation from the TLB.

During resource discovery for PCI devices, the VMM traps load instructions that read PCI configuration space in order to selectively expose and conceal the attached PCI devices. The VMM emulates the trapping load instructions in order to return the desired value to the OS instance for each probe: a device configuration header value if the VMM wishes to expose that device, or another value (e.g., −1) if the VMM wishes to conceal it. For ISA devices, the VMM uses a different mechanism for resource discovery. The Alpha architecture informs a booting OS instance of its attached ISA devices through a portion of a reset parameter block ("RPB") table. To partition ISA devices, the VMM modifies the RPB device table to expose only the ISA devices the booting operating system should discover, and to hide the rest.

For those I/O devices dedicated to a particular OS instance, the VMM gives direct, privileged access to that I/O device by inserting translations into the TLB for the KSEG I/O addresses associated with that device any time an attempt by the OS to access those addresses misses in the TLB. As a result, most accesses by the OS instance to the I/O device will not trap to the VMM and will complete at full hardware speed. The VMM will be invoked by the hardware when the OS's accesses to that device miss in the TLB, but those invocations of the VMM should be rare. When they occur, the VMM merely reinserts into the TLB the translation for the range of addresses that missed, an operation that involves a small number of instructions, and that does not require the VMM to emulate the attempted I/O device access.

EXAMPLE 2

Partitioning of Memory

In the Alpha architecture, the firmware informs a booting OS instance of the memory that OS instance can use via the RPB table in memory. The VMM can modify the RPB table to reveal the memory to an OS instance that it should claim, and hide memory it should not. The OS instance then defines page tables for that memory. For a TLB miss, the VMM fields the miss, inspects the PTE for that access, rejects the PTE, or installs it into TLB and lets the access complete.

EXAMPLE 3

Bus-Wise Partitioning of I/O Devices

A first OS instance "owns" a first I/O device, and a second OS instance owns a second I/O device. Both I/O devices are on the same PCI bus. The VMM will likely have to emulate some or all of the functionality of the PCI Host Bridge for that bus because the host bridge hardware is implicitly shared between the two OS instances. (In contrast, if the two I/O devices on different PCI buses, each with their own PCI Host Bridge, the VMM can dedicate the first I/O device to the first OS instance and the second I/O device to the second OS instance without having to emulate the host bridge, since no PCI host bridge is shared between the two OS instances).

In this example, the VMM chooses to partition bus-wise, whereby all the devices from one I/O bus are dedicated to one OS instance, while all the devices from another PCI bus are dedicated to another instance. Doing so may simplify partitioning, and reduce emulation. As with individual I/O devices, the VMM can selectively reveal or conceal entire buses. On some platforms, the VMM may configure the hardware to trap when the OS instance's probes its I/O buses during resource discovery, or it may modify a hardware description table to selectively hide or reveal I/O buses. On other platforms in which the OS instance reads a register in hardware to determine the I/O buses, the VMM can trap that access and return a value as appropriate to hide or reveal I/O buses.

Some operating systems make assumptions about the range of addresses associated with particular buses based on the total number of buses it discovers, and their topology. Consider a platform that can be configured with either one or two buses, where devices on bus 0 start at physical address A0 and devices on bus 1 start at physical address A1. When an OS instance for this platform discovers only one bus during resource discovery, it may assume that it finds bus 0 starting at address A0. Thus, to dedicate bus 1 to an instance of this OS, the VMM can expose only that bus to the booting OS instance in the manner described above. However, since the OS instance assumes that it discovers bus 0, and therefore attempts to access bus 0 starting at address A0, the VMM translates those accesses into accesses to bus 1. It can do so by inserting translations into the TLB or its page tables that map accesses to bus 0 to their corresponding addresses in bus 1's address space.

This third example illustrates that the VMM can dedicate I/O devices to particular OS instances, while performing emulation to share other devices or hardware resources. Which devices get assigned to particular partitions may affect how much emulation the VMM has to perform.

The VMM is not limited to any particular application. On-line computer maintenance is but one example. Another example is online debugging.

The present invention is not limited to the specific embodiments described and illustrated above. Instead, the present invention is construed according to the claims that follow.

The invention claimed is:

1. In a computer including hardware, a virtual machine monitor, and first and second operating system instances, a method comprising:
    using the virtual machine monitor (VMM) to expose the first operating system instance to a first hardware partition of the hardware and prevent the first operating system instance from discovering a second hardware partition of the hardware;
    using the virtual machine monitor to expose the second operating system instance to the second hardware partition and prevent the second operating system instance from discovering the first hardware partition; and
    using the virtual machine monitor to share at least some of the hardware among the first and second operating system instances that are booted on the VMM after the hardware is configured, wherein the VMM configures the hardware so accesses to requested addresses by the first OS trap to the VMM. the traps occurring during resource discovery of memory installed and input/output (I/O) devices present by a booting operating system (OS) instance consisting one of the first or second OS instances, and the VMM responds to a trap by misinforming the booting OS instance about the existence of hardware not in its partition.

2. The method of claim 1, wherein the first and second partitions include different portions of memory.

3. The method of claim 1, wherein the first and second partitions include different I/O devices.

4. The method of claim 1, wherein the shared hardware includes a CPU.

5. The method of claim 1, wherein the virtual machine monitor allows the first instance to have direct control over the first partition, and the second instance to have direct control over the second partition.

6. The method of claim 1, wherein the virtual machine monitor uses memory management to partition I/O devices.

7. The method of claim 6, wherein the VMM configures the hardware to trap to the VMM either when an access misses in a translation lookaside buffer, or when one of the operating system instances modifies its page table.

8. The method of claim 6, wherein the hardware is configured to treat physical addresses as virtual addresses, whereby the virtual machine monitor also uses memory management to trap accesses to physical addresses.

9. The method of claim 8, wherein the hardware includes a CPU, and wherein the virtual machine monitor configures the CPU to disable direct accessibility of the physical memory, whereby the VMM can trap I/O and physical memory accesses.

10. The method of claim 6, wherein using the memory management includes inspecting an address translation on a trap and modifying, accepting, or rejecting the translation.

11. The method of claim 6, wherein using the memory management includes inserting translations for I/O addresses into a translation lookaside buffer or page table.

12. The method of claim 11, wherein the virtual machine monitor grants unfettered access by an operating system instance to the range of physical memory covered by the translation entry in its translation lookaside buffer or page table.

13. The method of claim 1, wherein the virtual machine monitor modifies a hardware description table to expose and prevent discovery.

14. The method of claim 1, wherein the virtual machine monitor performs emulation to share hardware.

15. The method of claim 1, further comprising:
    delivering interrupts to interrupt handlers maintained by the first instance when the first instance accesses the first partition; and
    delivering interrupts directly to interrupt handlers maintained by the second instance when the second instance accesses the second partition.

16. The method of claim 1, wherein operation of the virtual machine monitor is transparent to the first and second operating system instances.

17. The method of claim 1, wherein the virtual machine monitor partitions I/O devices bus-wise.

18. In a computer including hardware, a virtual machine monitor running on the hardware, a method comprising:
booting a plurality of operating system (OS) instances on the virtual machine monitor (VMM);
using the virtual machine monitor to expose each of the booting operating system instances to its own partition and to prevent each of the operating system instances from discovering other hardware partitions; and
using the virtual machine monitor to share at least some of the hardware among the operating system instances;
wherein operation of the virtual machine monitor is transparent to the plurality of operating system instances, which are booted on the VMM after the hardware is configured, wherein the VMM configures the hardware so accesses to addresses requested by any OS instance trap to the VMM, the traps occur during resource discovery of memory installed and input/output (I/O) devices present by a booting OS instance, and the VMM responds to a trap by misinforming the booting OS instance about an existence of hardware not in its partition.

19. The method of claim 18, wherein the hardware includes a CPU, and wherein the virtual machine monitor can configure the CPU to disable direct accessibility of the physical memory, whereby the VMM can trap I/O and physical memory accesses.

20. The method of claim 18, wherein the virtual machine monitor uses memory management to partition I/O devices, the memory management including inspecting an address translation on a trap and modifying, accepting, or rejecting the translation.

21. The method of claim 18, wherein the virtual machine monitor uses memory management to partition I/O devices, the memory management including inserting translations for I/O addresses into a translation lookaside buffer or page table.

22. The method of claim 21, wherein the virtual machine monitor grants unfettered access by an operating system instance to the range of physical memory covered by the translation entry in its translation lookaside buffer or page table.

23. The method of claim 18, wherein the virtual machine monitor modifies a hardware description table to expose and prevent discovery.

24. The method of claim 18, wherein the virtual machine monitor partitions I/O devices bus-wise.

25. A computer comprising:
memory for storing a virtual machine monitor (VMM), a first operating system (OS) and a second OS;
a processor for running the VMM and first and second OS instances on the VMM;
the VMM designed to expose a first OS instance to a first hardware partition and prevent the first OS instance from discovering a second hardware partition;
the VMM designed to expose a second OS instance to the second hardware partition and prevent the second OS instance from discovering the first hardware partition;
the VMM designed to allow at least some hardware sharing among the first and second OS instances, which are booted on the VMM after the hardware is configured, wherein the VMM configures hardware so accesses to requested addresses by the first OS trap to the VMM, the traps occur during resource discovery of memory installed and input/output (I/O) devices present by a booting OS instance consisting one of the first or second OS instance, and the VMM responds to a trap by misinforming the booting OS instance about an existence of hardware not in its partition.

26. A computer for running first and second operating system (OS) instances, the computer comprising hardware including memory, the memory encoded with a virtual machine monitor (VMM) for exposing the first OS instance to a first partition of the hardware and preventing the first OS instance from discovering a second partition of the hardware; exposing the second OS instance to the second hardware partition and preventing the second OS instance from discovering the first hardware partition; and sharing at least some of the hardware among the first and second OS instances that are booted on the VMM after the hardware is configured, wherein the VMM configures the hardware so accesses to requested addresses by the first OS trap to the VMM, the traps occur during resource discovery of memory installed and input/output (I/O) devices present by a booting OS instance, consisting one of the first or second OS instance, and the VMM responds to a trap by misinforming the booting OS instance about an existence of the hardware not in its partition.

27. The computer of claim 26, wherein the hardware includes a CPU, and wherein the virtual machine monitor can configure the CPU to disable direct accessibility of the physical memory, whereby the VMM can trap I/O and physical memory accesses.

28. The computer of claim 26, wherein the virtual machine monitor can use memory management to partition I/O devices, the memory management including inspecting an address translation on a trap and modifying, accepting, or rejecting the translation.

29. The computer of claim 26, wherein the virtual machine monitor can use memory management to partition I/O devices, the memory management including inserting translations for I/O addresses into a translation lookaside buffer or page table.

30. The computer of claim 26, wherein the virtual machine monitor can modify a hardware description table to expose and prevent discovery.

31. The computer of claim 26, wherein the virtual machine monitor can partition I/O devices bus-wise.

32. An article for a computer, the article comprising computer memory encoded with a virtual machine monitor (VMM) for exposing a first operating system (OS) instance to a first hardware partition and preventing the first OS instance from discovering a second hardware partition; exposing a second OS instance to the second hardware partition and preventing the second OS instance from discovering the first hardware partition; and sharing at least some of the hardware among the first and second OS instances that are booted on the VMM after the hardware is configured, wherein the VMM configures the hardware so accesses to requested addresses by the first OS trap to the VMM, the traps occur during resource discovery of memory installed and input/output (I/O) devices present by a booting OS instance, consisting one of the first or second OS instances, and the VMM responds to a trap by misinforming the booting OS instance about an existence of the hardware not in its partition.

33. The article of claim 32, wherein the hardware includes a CPU, and wherein the virtual machine monitor can configure the CPU to disable direct accessibility of the physical memory, whereby the VMM can trap I/O and physical memory accesses.

34. The article of claim 32, wherein the virtual machine monitor can use memory management to partition I/O devices, the memory management including inspecting an address translation on a trap and modifying, accepting, or rejecting the translation.

35. The article of claim 32, wherein the virtual machine monitor can use memory management to partition I/O devices, the memory management including inserting translations for I/O addresses into a translation lookaside buffer or page table.

36. The article of claim 32, wherein the virtual machine monitor can modify a hardware description table to expose and prevent discovery.

37. The article of claim 32, wherein the virtual machine monitor can partition I/O devices bus-wise.

* * * * *

UNITED STATES PATENT AND TRADEMARK OFFICE
CERTIFICATE OF CORRECTION

PATENT NO. : 7,376,949 B2  Page 1 of 1
APPLICATION NO. : 10/676921
DATED : May 20, 2008
INVENTOR(S) : David E. Lowell et al.

It is certified that error appears in the above-identified patent and that said Letters Patent is hereby corrected as shown below:

In column 5, line 48, delete "QS" and insert -- OS --, therefor.

In column 10, line 10, in Claim 1, after "VMM" delete ".".

Signed and Sealed this

Thirteenth Day of January, 2009

JON W. DUDAS
*Director of the United States Patent and Trademark Office*